United States Patent Office 3,410,821
Patented Nov. 12, 1968

3,410,821
MASS-COLORATION FOR POLYESTER RESINS
Albert Charles Cooper, David Frederick White, and Donald Graham Wilkinson, Manchester, England, assignors to Imperial Chemical Industries Limited, London, England, a corporation of Great Britain
No Drawing. Filed Mar. 21, 1966, Ser. No. 535,662
Claims priority, application Great Britain, Mar. 26, 1965, 12,958/65
2 Claims. (Cl. 260—40)

ABSTRACT OF THE DISCLOSURE

Process for mass-coloring polyesters with phthaloperinone or naphthoylene benziminazoles containing 1 or 2 carboxylic acid groups or esters thereof.

---

This invention relates to a coloration process and more particularly to a process for the mass coloration of synthetic linear polyesters, particularly polyethylene terephthalate.

In order for a colouring matter to be completely satisfactory for use in the mass coloration of synthetic linear polyesters it must fulfil the following requirements:

(1) It must be capable of withstanding the high temperature of the molten material (290° C.).

(2) It must not have a high volatility, otherwise it may sublime during the spinning process, causing irregular coloration, and fabrics subsequently subjected to pleating operations may lose colour strength or cause marking of adjacent fabric.

It must have high fastness to light, and to the action of dry-cleaning solvents, perspiration and bleaches.

It has now been found that a class of polycyclic dyestuff compounds is particularly valuable for the mass coloration of synthetic linear polyesters.

According to the invention there is provided a process for the mass coloration of synthetic linear polyesters which comprises using as colouring matter one or more dyestuffs of the formula:

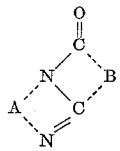

wherein one of A and B represents a 1:2-phenylene radical and the other of A and B represents a 1:2-phenylene, 1:2-naphthylene, 2:3-naphthylene, 1:8-naphthylene or a 1:8-acenapthylene radical, and the said radicals together contain at least one group of the formula:

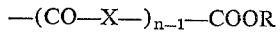

wherein R represents a hydrogen atom or an alkyl, hydroxyalkyl or alkoxyalkyl radical, X represents an alkylene or phenylene radical, $n$ represents 1 or 2, and A and B optionally contain further substituents other than sulphonic acid groups.

The alkylene radicals represented by X are preferably lower alkylene radicals containing from 1 to 6 carbon atoms, and as examples of such radicals there may be mentioned ethylene, trimethylene and tetramethylene radicals.

The alkyl radicals represented by R are preferably lower alkyl radicals such as methyl, ethyl, propyl and butyl radicals. The hydroxyalkyl radicals represented by R are preferably hydroxy lower alkyl radicals such as β-hydroxyethyl and β- or γ-hydroxypropyl radicals. The alkoxyalkyl radicals represented by R are preferably lower alkoxy lower alkyl radicals such as β-ethoxyethyl, β-methoxyethyl, and β- or γ-ethoxypropyl radicals.

Throughout this specification the terms "lower alkyl" and "lower alkoxy" are used to denote alkyl and alkoxy radicals respectively containing from 1 to 4 carbon atoms.

As examples of further substituents which may be present in the radicals A and B there may be mentioned chlorine, bromine, lower alkyl in particular methyl, lower alkoxy in particular methoxy and ethoxy, nitro and cyano.

The process of the invention can be conveniently carried out by incorporating one or more of the said dyestuffs into the synthetic linear polyesters by any of the known techniques for mass coloration of such materials. Thus the dyestuff in finely divided form may be coated onto chips of the polyester by tumbling and the resulting coloured mixture subsequently melted and spun into filaments or shaped into solid objects. If desired, tumbling may be carried out with a dispersion of the dyestuff in a volatile liquid e.g. water or alcohol, or such a liquid may be used to moisten the mixture of dyestuff and polymer during the stage of tumbling. The volatile liquid is preferably removed by evaporation before melting. The dyestuff may also be incorporated with monomers or prepolymers at any convenient stage in the preparation of the polyester.

If desired those dyestuffs which contain a carboxylic acid group can be used in the form of salts, such as the ammonium salts, which give rise to the free acids during the heat treatment required to melt the polyester.

As examples of synthetic linear polyesters which can be coloured by the process of the invention there may be mentioned polyesters which are obtained by the reaction of terephthalic acid with glycols of the formula $$HO—(CH_2)_x—OH$$

wherein $x$ is an integer of from 2 to 10, or with 1:4-di(hydroxymethyl)cyclohexane. The term synthetic linear polyesters also includes copolyesters based on the said polyesters, such copolyesters being obtained by replacing a portion of the terephthalic acid by another dicarboxylic acid or by a hydroxycarboxylic acid, and/or replacing a portion of the glycol by a different glycol.

The colorations produced by the process of the invention have good fastness to washing, pressure steaming, acid cross dyeing, perspiration, rubbing after steaming, dry heat treatments such as are used in pleating operations, and to light. It is also found that the colorations can be produced in heavy depths of shade, without impairing the properties of the synthetic linear polyesters or fibres derived therefrom.

The dyestuffs used in the process of the invention may themselves be obtained by condensing a diamine of the formula

with an anhydride of a dicarboxylic acid of the formula

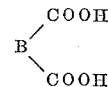

wherein A and B have the meanings stated, the said compounds together containing one or two

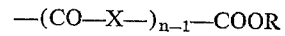

groups.

As examples of the said diamines there may be mentioned 1:2-phenylenediamine, 4-chloro-1:2-phenylenediamine, 4-nitro-1:2-phenylenediamine, 1:2-, 2:3- or 1:8-naphthylenediamine, 3:4-diaminobenzoic acid and 4-methyl-1:2-phenylenediamine.

As examples of the said anhydrides there may be mentioned phthalic anhydride, 4-chlorophthalic anhydride, 4-bromophthalic anhydride, 4:5:6:7-tetrabromophthalic anhydride, 4-nitrophthalic anhydride, trimellitic anhydride, 3-carboxyphthalic anhydride, 4-carbomethoxyphthalic anhydride, 1:8-naphthalic anhydride, 1:8-naphthalic anhydride 4-carboxylic acid and 4-(o-carboxybenzoyl)-1:8-naphthalic anhydride.

Alternatively the dyestuffs which contain the carboxylic acid group attached through an alkyl-CO- or phenyl-CO- group may be obtained by reacting the corresponding dyestuffs free from such groups with an alkylene or phenyl dicarboxylic acid in a Friedel-Crafts reaction.

Alternatively those dyestuffs which contain a carboxylic acid ester group can be obtained by esterifying the corresponding dyestuff containing a carboxylic acid group with the appropriate alcohol.

The invention is illustrated but not limited by the following examples in which the parts are by weight.

Example 1

1 part of 9- and/or 10-carboxyphthaloperinone in powder form is tumbled with 100 parts of polyethylene terephthalate in the form of chips. The resulting mixture is then melt spun in known manner to yield fibres of a bright orange red shade possessing excellent fastness properties.

The 9- and/or 10-carboxyphthaloperinone used in the above example was obtained by condensing 1 molecular proportion of 1:8-naphthylenediamine with 1 molecular proportion of trimellitic anhydride (4-carboxyphthalic anhydride).

Example 2

In place of the 1 part of the dyestuff used in Example 1 there is used 1 part of 8- and/or 11-carboxyphthaloperinone when yellowish-red fibres are obtained possessing excellent fastness properties.

The 8- and/or 11-carboxyphthaloperinone was itself obtained by condensing 1 molecular proportion of 3-carboxyphthalic anhydride with 1 molecular proportion of 1:8-naphthylenediamine.

Example 3

In place of the 1 part of the dyestuff used in Example 1 there is used 1 part of 3-(o-carboxybenzoyl)-phthaloperinone or 1 part of 3-(o-carboxybenzoyl)-8:9:10:11-tetrabromophthaloperinone when bright orange and bright red fibres respectively are obtained which possess excellent fastness properties.

The 3-(o-carboxybenzoyl)phthaloperinone was itself obtained by stirring a mixture of 42 parts of phthaloperinone, 23.5 parts of phthalic anhydride, 235 parts of aluminum chloride, 23.5 parts of sodium chloride and 31 parts of potassium chloride for 1 hour at 130° to 140° C. The mixture was then added to 2000 parts of a 5% aqueous solution of hydrochloric acid, and the precipitated dyestuff was filtered off, washed with water and dried.

The 3-(o - carboxybenzoyl) - 8:9:10:11 - tetrabromophthaloperinone was itself obtained by a similar method starting from 91 parts of 8:9:10:11-tetrabromophthaloperinone instead of the 42 parts of phthaloperinone.

Example 4

100 parts of dimethyl terephthalate, 71 parts of ethylene glycol and 0.05 part of manganese acetate are stirred together for 4 hours at 197° C., during which time about 33 parts of methanol distil off from the mixture. To this mixture is then added 0.04 part of phosphorous acid and 0.05 part of antimony trioxide and 3 parts of methylphthaloperinone 9- and/or 10-carboxylate which has previously been wetted out by ball milling for 30 minutes in the presence of 12 parts of ethylene glycol. The temperature of the mixture is then increased to 277° C. and the pressure is reduced to 0.3 mm. of mercury and the heating is continued under these conditions for a further 6 hours, whilst the excess ethylene glycol distils off. The melt is then formed into filaments which are subsequently drawn out into fibres. The fibres so obtained are coloured a deep orange shade possessing excellent fastness properties.

Example 5

100 parts of dimethyl terephthalate, 71 parts of ethylene glycol, 0.05 part of manganese acetate and 3 parts of methyl phthaloperinone 9- and/or 10-carboxylate are stirred for 4 hours at 197° C., during which time about 33 parts of methanol are distilled off. 0.04 part of phosphorous acid and 0.05 part of antimony trioxide are added, the temperature of the mixture is then increased to 277° C., the pressure is reduced to 0.3 mm. of mercury and heating is continued under these conditions for a further 6 hours whilst the excess ethylene glycol is distilled off. The mixture is then formed into filaments which are subsequently drawn out into fibres. The resulting fibres are coloured a deep orange shade possessing excellent fastness properties.

The methyl phthaloperinone 9- and/or 10-carboxylate used in the above example was obtained by heating a mixture of 7.9 parts of 1:8-naphthylenediamine and 9.7 parts of trimellitic anhydride 4-methylester (4-carbomethoxyphthalic anhydride) at 250° to 280° C. until evolution of water had ceased.

The following table gives further examples illustrating the process of the invention which may be carried out by methods similar to those described in Examples 1 to 5 above, but using the dyestuffs listed in the second column of the table. The third column of the table indicates the shades of the resulting polyester fibres.

| Example | Dyestuff | Shade |
|---|---|---|
| 6 | 3-(o-carboxybenzoyl)-8:9:10:11-tetrachlorophthaloperinone | Red. |
| 7 | 3-(o-carboxybenzoyl)-8:11-dichlorophthaloperinone | Orange-red. |
| 8 | 3-(o-carboxybenzoyl)-9-and/or 10-carboxyphthaloperinone | Red. |
| 9 | 3-(o-carboxybenzoyl)-9-and/or 10-nitrophthaloperinone | Red. |
| 10 | 3-(β-carboxypropionyl)phthaloperinone | Brown. |
| 11 | 9- and/or 10-carboxynaphthoylene benziminazole | Yellow. |
| 12 | 3,4-dicarboxynaphthoylene benziminazole | Reddish-yellow. |
| 13 | 3-carboxy-9- and/or 10-methylnaphthoylene benziminazole | Yellow. |
| 14 | 3-carboxy-9- and/or 10-nitronaphthoylene benziminazole | Do. |
| 15 | 9- and/or 10-(o-carboxybenzoyl)naphthoylene benziminazole | Greenish-yellow. |
| 16 | 9- and/or 10-(β-carboxypropionyl)naphthoylene benziminazole | Yellow. |
| 17 | β-hydroxyethyl ester of 9- and/or 10-carboxyphthaloperinone | Orange-red. |
| 18 | β-hydroxyethyl ester of 8- and/or 11-carboxyphthaloperinone | Yellowish-red. |
| 19 | β-hydroxyethyl ester of 3-(o-carboxybenzoyl)phthaloperinone | Orange. |
| 20 | β-ethoxyethyl ester of 9- and/or 10-carboxyphthaloperinone | Orange-red. |

Example 21

In place of the 1 part of the dyestuff used in Example 1 there is used 1 part of the dyestuff of the formula:

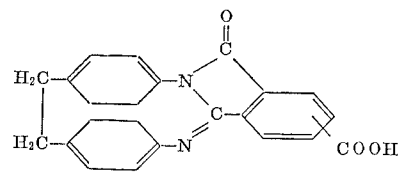

whereby fibres of a deep maroon shade are obtained which possess excellent fastness properties.

The dyestuff used in this example was obtained by condensing together equimolecular proportions of 5:6-diaminoacenaphthene and 4-carboxyphthalic anhydride.

The dyestuffs used in Examples 6 to 9, which all contained a 3-(o-carboxybenzoyl) group, were obtained by condensing 8:9:10:11-tetrachlorophthaloperinone, 8:11-dichlorophthaloperinone, 9- and/or 10-carboxyphthaloperinone or 9- and/or 10-nitrophthaloperinone respectively with phthalic anhydride at 130° C. in the presence of aluminium chloride, sodium chloride and potassium chloride.

The 3-(β-carboxypropionyl)phthaloperinone used in Example 10 was obtained by condensing phthaloperinone with succinic anhydride at 130° C. in the presence of aluminium chloride, sodium chloride and potassium chloride.

The dyestuff, or mixture of dyestuffs used in Example 11 was obtained by condensing together equimolecular proportions of 3:4-diaminobenzoic acid and 1:8-naphthalic anhydride in boiling acetic acid. The dyestuffs used in Examples 12 to 14 were prepared in similar manner from equimolecular proportions of o-phenylenediamine and naphthalene 1:4:5:8-tetracarboxylic acid, 4-methyl-o-phenylenediamine and 4-carboxy-1:8-naphthalic anhydride and 4-nitro-o-phenylenediamine and 4-carboxy-1:8-naphthalic anhydride respectively.

The dyestuffs used in Examples 15 and 16 were obtained by condensing naphthoylenebenziminazole with phthalic anhydride or succinic anhydride respectively at 140° C. in the presence of aluminium chloride, sodium chloride and potassium chloride.

The dyestuffs used in Examples 17 to 19 were obtained by reacting with ethylene chlorohydrin the sodium salt of the corresponding carboxylic acid.

The dyestuff used in Example 20 was obtained by treating 9- and/or 10-carboxyphthaloperinone with thionyl chloride and reacting the resulting acid chloride with β-ethoxyethanol.

What we claim is:

1. Process for the mass coloration of synthetic linear polyesters which comprises mixing at least one dyestuff of the formula

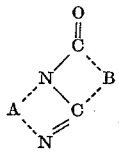

wherein one of A and B represents a 1:2 phenylene radical, and the other of A and B is selected from the class consisting of 1:2 phenylene, 1:8 naphthylene and 1:8 acenaphthylene radicals, and the said radicals contain from 1 to 2 groups of the formula —(CO—X—)$_{n-1}$—COOR wherein R is selected from the class consisting of hydrogen, lower alkyl having 1–4 carbon atoms, hydroxy lower alkyl having 1–4 carbon atoms and lower alkoxy lower alkyl wherein each of the alkoxy and alkyl moieties has 1–4 carbon atoms;

X is selected from the class consisting of lower alkylene having 1–6 carbon atoms and phenylene;

$n$ is a positive integer from 1 to 2;

and any further substituents on A and B are selected from the class consisting of chlorine, bromine, nitro and lower alkyl having 1–4 carbon atoms, with the said polyester and subsequently melting the mixture and shaping it into a solid object.

2. Process for the mass coloration of synthetic linear polyesters which comprises mixing with the polyester forming ingredients at least one dyestuff of the formula

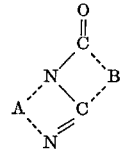

wherein one of A and B represents a 1:2 phenylene radical, and the other of A and B is selected from the class consisting of 1:2 phenylene, 1:8 naphthylene and 1:8 acenaphthylene radicals, and the said radicals contain from 1 to 2 groups of the formula —(CO—X—)$_{n-1}$—COOR wherein R is selected from the class consisting of hydrogen, lower alkyl having 1–4 carbon atoms, hydroxy lower alkyl having 1–4 carbon atoms and lower alkoxy lower alkyl wherein each of the alkoxy and alkyl moieties has 1–4 carbon atoms;

X is selected from the class consisting of lower alkylene having 1–6 carbon atoms and phenylene;

$n$ is a positive integer from 1 to 2;

and any further substituents on A and B are selected from the class consisting of chlorine, bromine, nitro and lower alkyl having 1–4 carbon atoms, and then polymerizing said mixture to produce the mass colored synthetic linear polyester.

References Cited

UNITED STATES PATENTS

| | | |
|---|---|---|
| 2,955,902 | 10/1960 | Merian. |
| 3,036,077 | 5/1962 | Altermatt. |
| 3,103,403 | 9/1963 | Eaton et al. _____ 260—309.6 |
| 3,104,233 | 9/1963 | Altermatt. |
| 3,228,780 | 1/1966 | Grelat. |
| 3,242,179 | 3/1966 | Christmann et al. _____ 260—40 |

MORRIS LIEBMAN, *Primary Examiner.*

L. T. JACOBS, *Assistant Examiner.*